(12) United States Patent
Dai et al.

(10) Patent No.: US 10,487,235 B2
(45) Date of Patent: Nov. 26, 2019

(54) LIVING CATIONIC RING-OPENING POLYMERIZATION (C-ROP) SELF HEALING COATING FOR BATTERY MODULE PACKAGING IN ELECTRIC VEHICLES (EV)

(71) Applicant: GM Global Technology Operations LLC, Detroit, MI (US)

(72) Inventors: Fang Dai, Troy, MI (US); Mei Cai, Bloomfield Hills, MI (US); Tao Wang, Oakland Township, MI (US); Mohammed Bahauddin, Rochester Hills, MI (US); Sherman Zeng, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 294 days.

(21) Appl. No.: 15/435,820

(22) Filed: Feb. 17, 2017

(65) Prior Publication Data

US 2018/0237656 A1 Aug. 23, 2018

(51) Int. Cl.
*H01M 2/10* (2006.01)
*H01M 10/0525* (2010.01)
(Continued)

(52) U.S. Cl.
CPC ............. *C09D 171/00* (2013.01); *F28D 1/03* (2013.01); *H01M 2/1077* (2013.01);
(Continued)

(58) Field of Classification Search
CPC .......... H01M 2/1094; H01M 10/0525; H01M 10/625; H01M 10/6567; H01M 2220/20; H01M 2/1077
See application file for complete search history.

(56) References Cited

U.S. PATENT DOCUMENTS

| 6,225,002 B1 * | 5/2001 | Nimon | ............. H01M 10/0569 29/623.5 |
| 2014/0242450 A1 * | 8/2014 | Oono | .................... B32B 15/088 429/176 |

(Continued)

OTHER PUBLICATIONS

Binder, Wolfgang H. "Self-healing polymers," Polymer, 69 (2015), p. 215; DOI: 10.1016/j.polymer.2015.06.037 (Published Jul. 9, 2015).

(Continued)

*Primary Examiner* — Carlos Barcena
(74) *Attorney, Agent, or Firm* — Harness, Dickey & Pierce, P.L.C.

(57) ABSTRACT

The present disclosure provides a battery pack component including a self-healing coating. The self-healing coating is disposed on at least a portion of a surface of the battery pack component. The self-healing coating includes a first precursor including a cyclic ether capable of reacting in a self-healing cationic ring-opening polymerization reaction. The self-healing coating further includes an initiator including an alkali metal salt. The self-healing cationic ring-opening polymerization reaction occurs when a defect is present in the self-healing coating. In certain aspects, the cyclic ether may include 1,3-dioxolane ($C_3H_6O_2$) and the initiator may include lithium bis(fluorosulfonyl)imide ($F_2NaNO_4S_2$). In other aspects, the self-healing coating may include a second precursor that is capable of copolymerizing with the first precursor. In still other aspects, the present disclosure provides a method of making a self-healing coating for a battery pack component.

19 Claims, 4 Drawing Sheets

(51) Int. Cl.
*C09D 171/00* (2006.01)
*H01M 10/625* (2014.01)
*H01M 10/6567* (2014.01)
*F28D 1/03* (2006.01)

(52) U.S. Cl.
CPC ....... *H01M 2/1094* (2013.01); *H01M 10/625* (2015.04); *H01M 10/6567* (2015.04); *H01M 10/0525* (2013.01); *H01M 2220/20* (2013.01); *Y02E 60/122* (2013.01)

(56) References Cited

U.S. PATENT DOCUMENTS

| | | | |
|---|---|---|---|
| 2015/0044517 A1* | 2/2015 | Mikhaylik | H01M 4/366 429/49 |
| 2016/0049217 A1* | 2/2016 | Tee | H01M 4/622 429/217 |

OTHER PUBLICATIONS

Blaiszik, B. J. et al., "Self-Healing Polymers and Composites," Annu. Re. Mater. Res., 2010 40 (1), pp. 179-211; DOI: 10.1146/annurev-atsci-070909-104532 (Published online Apr. 5, 2010).

* cited by examiner

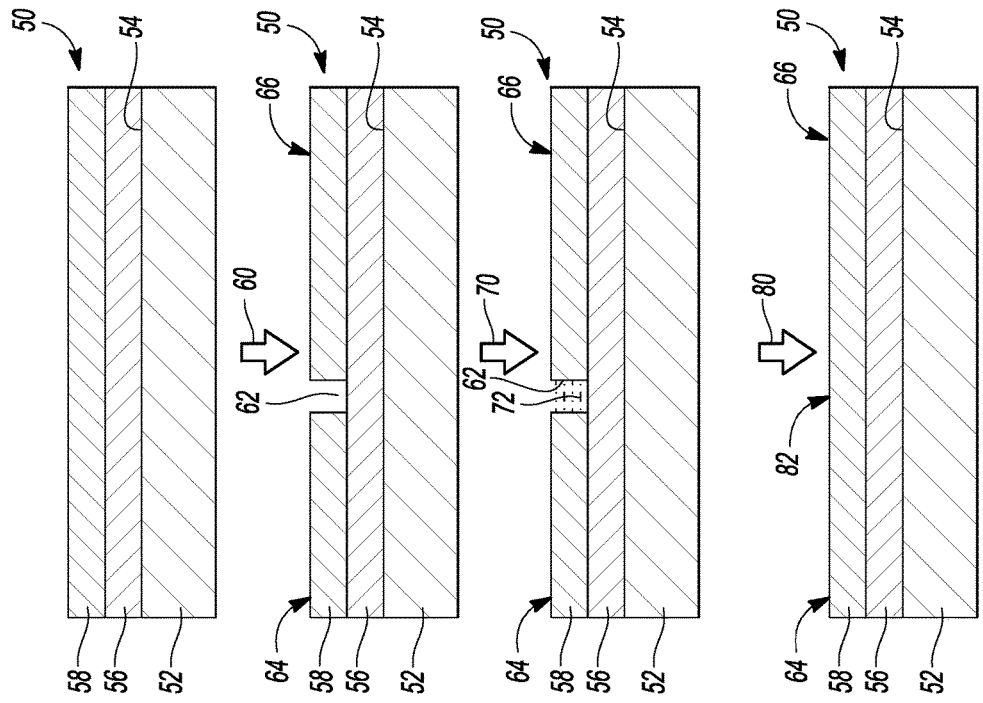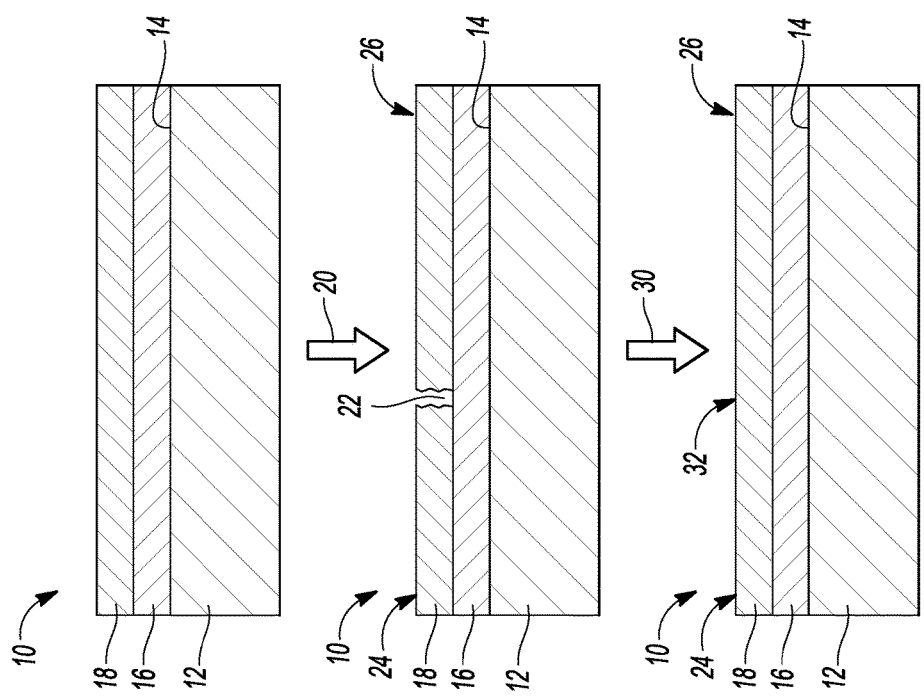

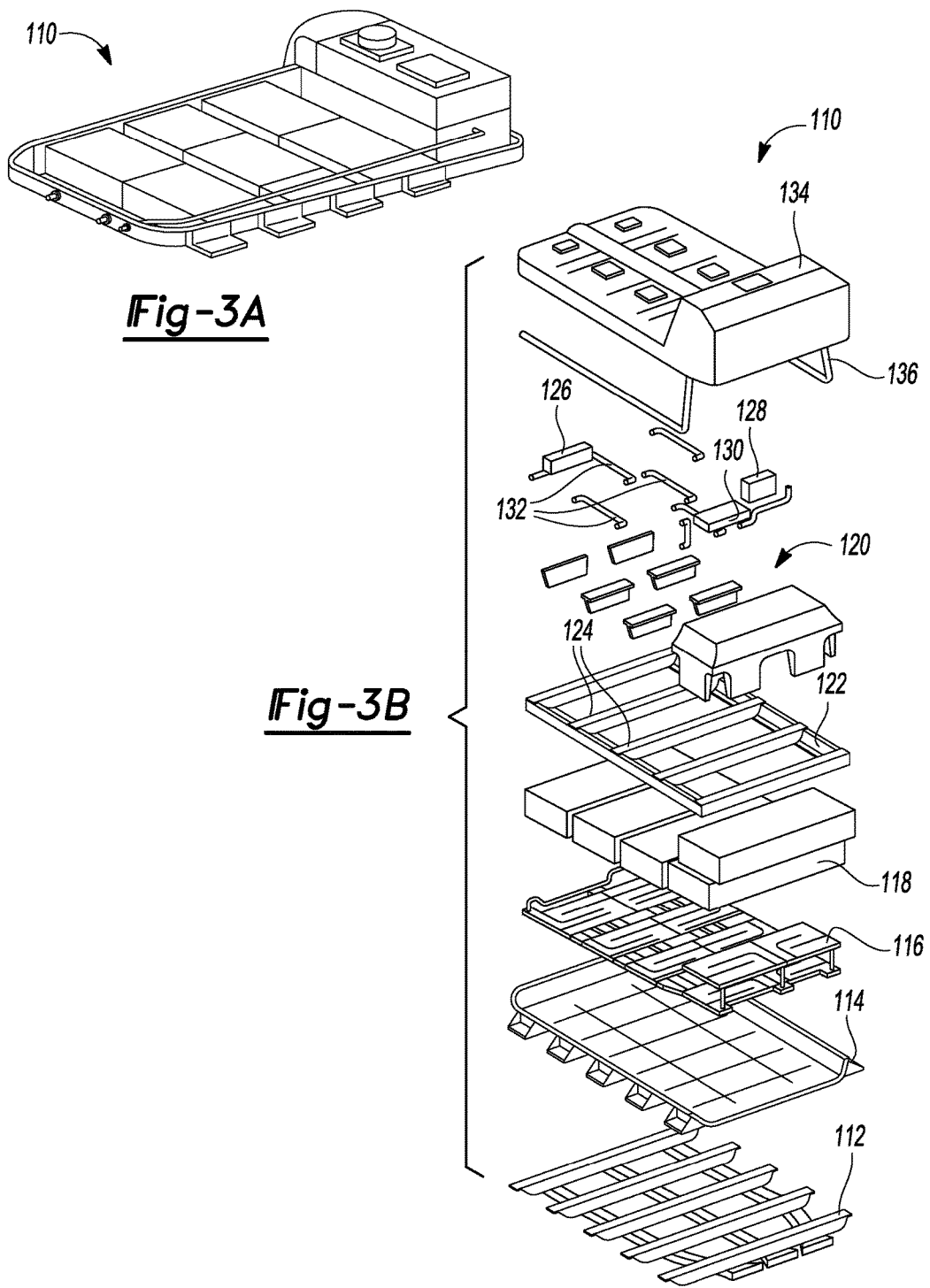

US 10,487,235 B2

LIVING CATIONIC RING-OPENING POLYMERIZATION (C-ROP) SELF HEALING COATING FOR BATTERY MODULE PACKAGING IN ELECTRIC VEHICLES (EV)

INTRODUCTION

This section provides background information related to the present disclosure which is not necessarily prior art.

High-energy density, electrochemical cells, such as lithium ion batteries can be used in a variety of consumer products and vehicles, such as Electric Vehicles (EVs) and Hybrid Electric Vehicles (HEVs).

Batteries may suffer from damage such as liquid leakage and short-circuiting. Liquid leakage may occur in battery cells, or in a cooling system, by way of non-limiting example. Short-circuiting may occur when battery surfaces become damaged or scratched. As a result, battery packages can suffer from low abuse tolerance due to surface damage and leakage. Thus, there is a need for improved battery coatings having a higher resilience to damage.

SUMMARY

This section provides a general summary of the disclosure, and is not a comprehensive disclosure of its full scope or all of its features.

The present disclosure relates to battery modules for electric vehicles (EVs), and more particularly, to battery pack components of EV battery modules having one or more surfaces having a self-healing coating and manufacturing methods thereof.

In various aspects, the present disclosure provides a battery pack component including a self-healing coating. The self-healing coating is disposed on at least a portion of a surface of the battery pack component. The self-healing coating includes a first precursor including a cyclic ether capable of reacting in a self-healing cationic ring-opening polymerization reaction. The self-healing coating also includes an initiator including an alkali metal salt. The alkali metal salt is selected from the group consisting of: lithium hexafluorophosphate (LiPF$_6$), lithium tetrafluoroborate (LiBF$_4$), lithium fluoride (LiF), lithium bis(fluorosulfonyl)imide (F$_2$LiNO$_4$S$_2$), sodium hexafluorophosphate (NaPF$_6$), sodium tetrafluoroborate (NaBF$_4$), sodium fluoride (NaF), sodium bis(fluorosulfonyl)imide (F$_2$NNaO$_4$S$_2$), potassium hexafluorophosphate (KPF$_6$), potassium tetrafluoroborate (KBF$_4$), potassium fluoride (KF), potassium bis(fluorosulfonyl)imide (F$_2$KNO$_4$S$_2$), and combinations thereof. The self-healing cationic ring-opening polymerization reaction occurs when a defect is present in the self-healing coating.

In certain variations, the alkali metal salt is an alkali metal imide salt. The alkali metal imide salt is selected from the group consisting of: lithium bis(fluorosulfonyl)imide (F$_2$NaNO$_4$S$_2$), sodium bis(fluorosulfonyl)imide (F$_2$LiNO$_4$S$_2$), potassium bis(fluorosulfonyl)imide (F$_2$KNO$_4$S$_2$), and combinations thereof.

In certain other variations, the cyclic ether is selected from the group consisting of: 1,3-dioxolane (C$_3$H$_6$O$_2$), tetrahydrofuran (THF) (C$_4$H$_8$O), 1,4-dioxane (C$_4$H$_8$O$_2$), ethylene oxide (C$_2$H$_4$O), tetrahydropyran (C$_5$H$_{10}$O), and combinations thereof.

In some variations, the self-healing coating further includes a first polymer incorporating the first precursor.

In still other variations, the self-healing coating further includes a non-reactive polymer matrix. The first precursor and the initiator are dispersed within the non-reactive polymer matrix.

In certain variations, the non-reactive polymer matrix includes a resin. The resin is selected from the group consisting of: polyethylene resin, polypropylene resin, polyethylene oxide resin, phenolic resin, formaldehyde resin, and combinations thereof.

In other variations, the self-healing coating further includes a second precursor capable of copolymerizing with the first precursor.

In some variations, the second precursor comprises a monomer. The monomer is selected from the group consisting of: hexamethylene cyclotrisiloxane (D3) (C$_6$H$_{18}$O$_3$Si$_3$), allyl disulfide (C$_6$H$_{10}$S$_2$), poly(ethylene glycol) methyl ether methacrylate (PMMA) ((C$_5$O$_2$H$_8$)$_n$), polydimethylsiloxane (PDMS) ((C$_2$H$_6$OSi)$_n$), and combinations thereof.

In certain other variations, the self-healing coating has a thickness of greater than or equal to about 50 nanometers to less than or equal to about 500 microns.

In still other variations, the battery pack component is selected from the group consisting of: a cooling system, a coolant pipe, a coolant plate, a case, a cover, a package, a cell, a body, and combinations thereof.

In other variations, the battery pack component includes one or more cells. Each cell includes two tabs and two respective joints connecting the tabs to the cells. The self-healing coating is disposed on at least one of a surface of the one or more cells, an edge of the one or more cells, and a joint.

In certain variations, the self-healing coating is capable of repairing defects in the self-healing coating, thereby sealing the battery pack component to prevent fluid leaks from an interior of the battery pack component to an exterior of the battery pack component.

In other variations, the battery pack component further includes an insulating layer comprising a second polymer. The insulating layer is disposed between the surface and the self-healing coating.

In other aspects, the present disclosure provides a battery pack component. The battery pack component includes a self-healing coating. The self-healing coating is disposed on at least a portion of a surface of the battery pack component. The self-healing coating includes first precursor and an initiator. The first precursor includes 1,3-dioxolane (C$_3$H$_6$O$_2$). The initiator includes lithium bis(fluorosulfonyl)imide (F$_2$NaNO$_4$S$_2$). The first precursor is capable of reacting in a self-healing cationic ring-opening polymerization reaction. The self-healing cationic ring-opening polymerization reaction occurs when a defect is present in the self-healing coating.

In certain variations, the surface of the battery pack component comprises aluminum.

In certain other variations, the battery pack component further includes an insulating layer. The insulating layer includes nylon ((C$_{12}$H$_{22}$N$_2$O$_2$)$_n$). The insulating layer is disposed between the surface and the self-healing coating.

In still other aspects, the present disclosure provides a method of making a self-healing coating for a battery pack component. The method includes combining a precursor and an initiator. The precursor includes a cyclic ether. The initiator includes an alkali metal salt. The alkali metal salt is selected from the group consisting of: lithium hexafluorophosphate (LiPF$_6$), lithium tetrafluoroborate (LiBF$_4$), lithium fluoride (LiF), lithium bis(fluorosulfonyl)imide (F$_2$NaNO$_4$S$_2$), sodium hexafluorophosphate (NaPF$_6$), sodium tetrafluoroborate (NaBF$_4$), sodium fluoride (NaF), sodium bis(fluorosulfonyl)imide (F$_2$LiNO$_4$S$_2$), potassium hexafluorophosphate (KPF$_6$), potassium tetrafluoroborate (KBF$_4$), potassium fluoride (KF), potassium bis(fluorosulfonyl)imide (F$_2$KNO$_4$S$_2$), and combinations thereof. The precursor is capable of polymerizing by a cationic ring-opening reaction to form the self-healing coating. The method further includes disposing the self-healing coating on at least a portion of a surface of the battery pack component.

In certain variations, the combining includes adding the precursor and the initiator at greater than or equal to 1 molar initiator to precursor to less than or equal to 2 molar initiator to precursor.

In other variations, the method further includes repairing a defect in the self-healing coating. Repairing a defect includes polymerizing the precursor in the presence of the initiator by a cationic ring-opening reaction to form a repaired region within the defect.

In still other variations, repairing a defect further includes applying a pre-polymer solution including the precursor and the initiator to the defect to form the repaired region within the defect. The repaired region includes the self-healing coating.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 shows a method of repairing a defect in a self-healing coating according to certain aspects of the present disclosure;

FIG. 2 shows another method of repairing a defect in a self-healing coating according to certain aspects of the present disclosure;

Figure 3C:
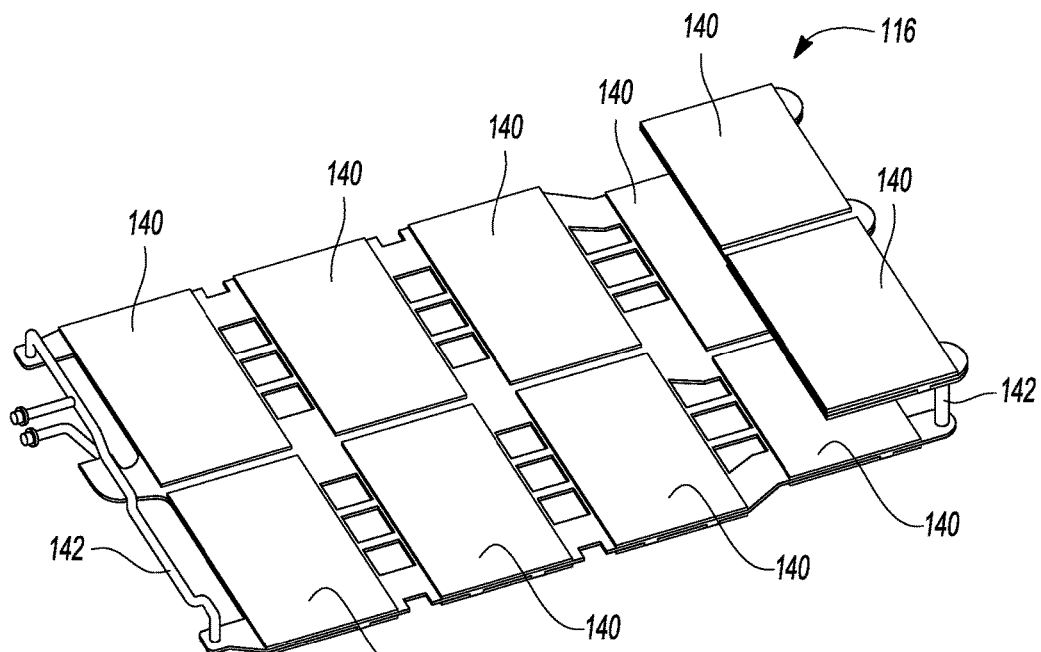
Figure 3D:
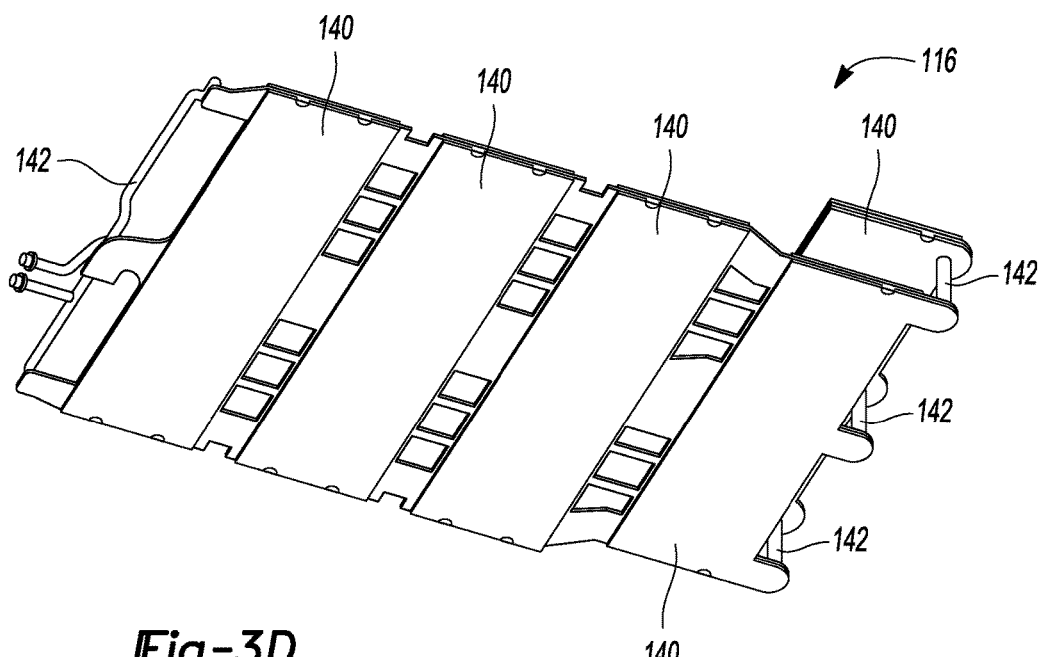
Figure 4A:
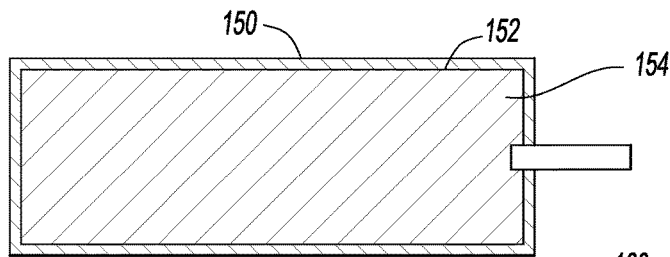
Figure 4B:
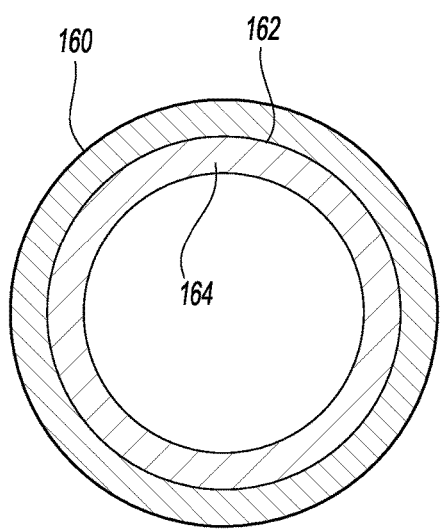
Figure 4C:
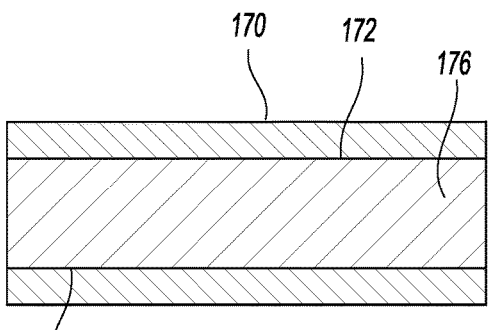
Figure 5:
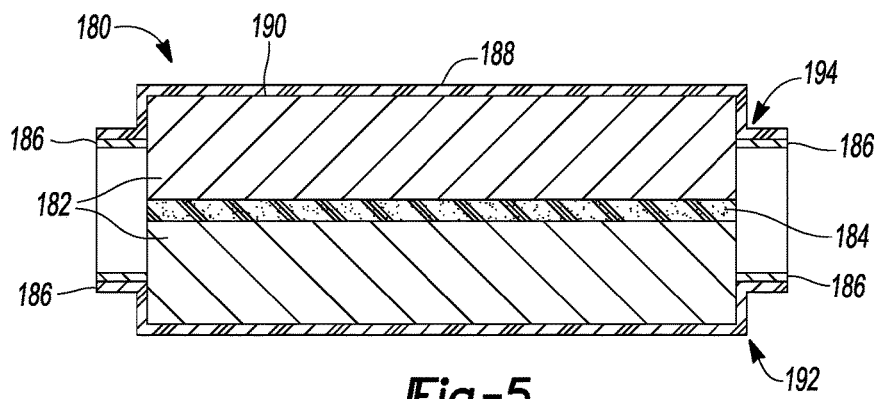

FIGS. 3A-3D show a battery having a self-healing coating according to certain aspects of the present disclosure. FIG. 3A shows a battery; FIG. 3B shows an exploded view of the battery of FIG. 3A; FIG. 3C shows top perspective view of a cooling system of the battery of FIG. 3A; FIG. 3D shows a bottom perspective view of the cooling system of FIG. 3C;

FIGS. 4A-4C show battery pack components having a self-healing coating according to certain aspects of the present disclosure. FIG. 4A shows a battery package; FIG. 4B shows a pipe of a cooling system; and FIG. 4C shows a plate of a cooling system; and FIG. 5 shows a battery pack having two cells and a self-healing coating according to certain aspects of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

As used herein, the term "self-healing" refers to self-recovery of at least a portion of mechanical integrity and initial properties of a material after destructive actions of an external or internal stress. Self-healing may also include repairing of cracks within a composite material. Self-healing attributes are further discussed below.

Example embodiments will now be described more fully with reference to the accompanying drawings.

Self-healing materials are capable of repairing defects after being damaged. Certain self-healing materials react in situ to heal. The reagents of a self-healing material may be distributed within a matrix, or dispersed in a microcapsule or a vascular structure. Sensitive catalysts must be protected, for example by a wax coating. Even protected catalyst capsules may break open too soon, resulting in undesirable reactions. In some structural arrangements, self-healing coatings are only capable of a singular local healing event. For example, where microcapsules of reagents are dispersed in a polymer matrix, after the precursor is consumed in a given area to repair a defect, no precursor will remain to heal subsequent defects. Precursors may be similarly consumed in a vascular structure, however, replenishment is possible.

In certain aspects, the inventive technology addresses one or more of these shortcomings. One method of self-healing a material defect is utilization of a ring-opening polymerization ("ROP") reaction. Cationic ring-opening polymerizations ("c-ROP") involve a positively charged intermediate. In a ring-opening polymerization reaction, precursors react in the presence of an initiator or catalyst to form polymers. Suitable initiators for cationic ring-opening reactions, such as Grubbs' catalyst and organotin catalyst, include metals and may be costly. Certain cationic ring-opening reactions, referred to as "living cationic ring-opening polymerizations," are capable of continuously polymerizing until the precursor is consumed.

In various aspects, the present disclosure provides a method of making a self-healing coating for a battery pack component. The method may include repairing a defect through a cationic ring-opening reaction. The defect can be cosmetic, such as a crack, groove, or a pit or the defect can be structural, such as a large crack that spans two surfaces of a polymeric composite structure or a hole. In other aspects, the present disclosure provides a battery pack component including a self-healing coating disposed on at least a portion of a surface of the battery pack component. Certain self-healing coating materials may include a precursor that undergoes a ring-opening polymerization and an initiator.

In certain embodiments, a method of making a self-healing healing coating for a battery pack component is provided. The method includes combining a precursor and an initiator. The precursor is capable of polymerizing by a cationic ring-opening reaction to form the self-healing coating. The cationic ring-opening reaction may be living, such that it continuously polymerizes at certain temperatures and concentrations until all of the precursor has reacted or a terminator has been added to stop the reaction.

In various aspects, the precursor may be a heterocycle. Heterocycles that may react in a cationic ring-opening polymerization include cyclic ethers, cyclic thioethers, cyclic amines, cyclic lactones, cyclic thiolactones, cyclic lactums, and cyclic siloxanes, by way of non-limiting example. In certain aspects, the heterocycle comprises an oxygen heteroatom. Thus, in certain variations, the precursor may include a cyclic ether. By way of non-limiting example, the cyclic ether may include: 1,3-dioxolane ($C_3H_6O_2$), tetrahydrofuran (THF) ($C_4H_8O$), 1,4-dioxane ($C_4H_8O_2$), ethylene oxide ($C_2H_4O$), tetrahydropyran ($C_5H_{10}O$), or combinations thereof.

The initiator may include an alkali metal salt selected from the group consisting of: lithium hexafluorophosphate ($LiPF_6$), lithium tetrafluoroborate ($LiBF_4$), lithium fluoride (LiF), lithium bis(fluorosulfonyl)imide ($F_2NaNO_4S_2$), sodium hexafluorophosphate ($NaPF_6$), sodium tetrafluoroborate ($NaBF_4$), sodium fluoride (NaF), sodium bis(fluorosulfonyl)imide ($F_2LiNO_4S_2$), potassium hexafluorophosphate ($KPF_6$), potassium tetrafluoroborate ($KBF_4$), potassium fluoride (KF), potassium bis(fluorosulfonyl)imide ($F_2KNO_4S_2$), and combinations thereof. In certain aspects, the initiator may include an alkali metal imide salt. The alkali metal imide salt may be selected from the group consisting of: lithium bis(fluorosulfonyl)imide ($F_2NaNO_4S_2$), sodium bis(fluorosulfonyl)imide ($F_2LiNO_4S_2$), potassium bis(fluorosulfonyl)imide ($F_2KNO_4S_2$), and combinations thereof.

The precursor and the initiator may be combined to form the self-healing coating. The speed of polymerization may be controlled by optimizing the concentration of the precursor and the initiator. For example, the combining may include adding the precursor and the initiator in the following amounts: greater than or equal to about 0.1 molar (M) initiator to precursor to less than or equal to about 5 molar (M) initiator to precursor, optionally greater than or equal to about 1 molar (M) initiator to precursor to less than or equal to about 2 molar (M) initiator to precursor, optionally about 1.5 molar (M) initiator to precursor. The speed of the cationic ring-opening polymerization reaction may also be controlled by temperature. More specifically, polymerization occurs more rapidly at high temperatures greater than or equal to about 60° C. In contrast, polymerization may be slower at low temperatures less than or equal to about −20° C.

The self-healing coating may be applied to a surface of a battery pack component. Applying the self-healing coating to the surface of the battery pack component may include applying the self-healing coating on top of another coating, such as an insulating polymer coating. Optionally, the self-healing coating may be applied directly to the surface of the battery pack component.

In certain aspects, a self-healing coating may be formed from a solidified polymer. The solidified polymer may include a precursor and an initiator. The solidified polymer may be dissolved in a liquid including the precursor to form a self-healing coating including the precursor and the initiator. The self-healing coating may be applied to a surface a battery pack component.

In certain other aspects, another method of forming a self-healing coating for a battery pack component is provided. The self-healing coating includes a precursor and an initiator blended with other polymers or resins. The method includes dispersing the precursor and the initiator in a polymer matrix to form the self-healing coating. Dispersing the precursor and the initiator in the polymer matrix may include encapsulating the precursor and the initiator to form microcapsules and distributing the microcapsules throughout the polymer matrix. Forming microcapsules may further include applying a protective coating such as wax around the initiator. In other aspects, dispersing the precursor and the initiator in the polymer matrix may include filling hollow channels or capillaries with the precursor and the initiator and creating a network of the channels or capillaries in the polymer matrix.

The method further includes applying the self-healing coating to a surface of a battery pack component. The precursor may include a heterocycle, such as a cyclic ether and the initiator may include an alkali metal salt, such as an alkali metal imide salt, by way of non-limiting example. The polymer or resin may be selected so that it is compatible and non-reactive with the precursor. By way of non-limiting example, the polymer matrix may include a resin such as polyethylene resin, polypropylene resin, polyethylene oxide resin, phenolic resin, formaldehyde resin, or combinations thereof.

In various other aspects, still another method of forming a self-healing coating for a battery pack component is provided. The self-healing coating includes a first precursor, a second precursor, and at least one initiator. The first precursor and the second precursor are capable of copolymerizing and forming a copolymer. The first precursor may be a cyclic ether and the initiator may be an alkali metal imide salt, by way of non-limiting example. The second precursor may be another monomer such as hexamethylene cyclotrisiloxane (D3) ($C_6H_{18}O_3Si_3$), allyl disulfide ($C_6H_{10}S_2$), poly(ethylene glycol) methyl ether methacrylate (PMMA) (($C_5O_2H_8)_n$), polydimethylsiloxane (PDMS) (($C_2H_6OSi)_n$), or combinations thereof, by way of non-limiting example. The weight ratio of the first precursor to the second precursor may be greater than or equal to about 1:10 and less than or equal to about 10:1.

In certain aspects, the at least one initiator may include a first initiator and a second initiator. The first initiator may include an alkali metal salt. The need for a second initiator is dependent on the reactivity of the second precursor. Certain second precursors, such as hexamethylene cyclotrisiloxane (D3) ($C_6H_{18}O_3Si_3$) and allyl disulfide ($C_6H_{10}S_2$), are reactive enough to polymerize without a second initiator. Other second precursors, such as poly (ethylene glycol) methyl ether methacrylate (PMMA) (($C_5O_2H_8)_n$) and polydimethylsiloxane (PDMS) (($C_2H_6OSi)_n$), may require a distinct second initiator for polymerization. The weight of second initiator may be directly proportional to the weight of second precursor.

In various aspects, the present disclosure provides a method of repairing a defect in a self-healing coating. The self-healing coating includes a precursor and an initiator. The precursor may be present in the self-healing coating as a monomer, an oligomer, a reactive group incorporated in a polymer, or a reactive group incorporated in a copolymer. The method includes polymerizing the precursor in in the presence of the initiator by a cationic ring-opening reaction to form a repaired region within the defect.

Referring to FIG. 1, a coated battery pack component 10 includes a battery pack component 12 having a surface 14. The surface includes a surface coating 16, which may be an insulating coating including a polymer such as nylon. A self-healing coating 18 is disposed on the surface coating 16. Although a surface coating 16 is shown between the surface 14 of the battery 12 and the self-healing coating 18, it should be understood that the self-healing coating 18 may be applied directly to the surface 14 of the battery pack component 12 (not shown).

At step 20, the self-healing coating 18 is damaged. The damage causes one or more polymer chains in the self-healing coating 18 to break, so that the self-healing coating 18 includes at least one defect 22. The defect 22 may be a crack, groove, or a pit, by way of non-limiting example. The defect 22 may separate the self-healing coating 18 into a first portion 24 and a second portion 26. The broken polymer may include a reactive precursor. For example, the reactive precursor may be present as an end group on a polymer or oligomer.

At step 30, the defect 22 is repaired. Repairing includes reacting the broken polymer having a reactive precursor with additional precursor in the presence of the initiator in a cationic ring-opening polymerization reaction to heal the defect 22 and form a repaired region 32. The repaired region 32 includes the self-healing coating 18.

Referring now to FIG. 2, another method of healing a defect in a self-healing coating is provided. A coated battery pack component 50 includes a battery pack component 52 having a surface 54. The surface includes a surface coating 56, which may be an insulating coating including a polymer such as nylon. A self-healing coating 58 is disposed on the surface coating 56. The coated battery pack component 50 may alternatively be provided without a surface coating 56 so that the self-healing coating 58 is disposed directly on the surface 54 of the battery pack component 52 (not shown).

At step 60, the self-healing coating 58 is damaged. The damage may break one or more polymers in the self-healing coating 58 so that the self-healing coating 58 includes at least one defect 62. The defect 62 may be a large crack or a hole, by way of non-limiting example. The defect 62 may separate the self-healing coating 58 into a first portion 64 and a second portion 66. The broken polymer may include a reactive precursor. For example, the reactive precursor may be present as an end group on a polymer or oligomer.

At step 70, a pre-polymer solution 72 including the precursor and the initiator is applied to the defect 62. The pre-polymer solution 72 may have the same composition as the self-healing coating. The precursor in the pre-polymer solution 72 may react with precursor in the first portion 64, the second portion 66, and the pre-polymer solution 72 in a cationic ring-opening polymerization. At step 80, the defect 62 is repaired to form a repaired region 82. The repaired region 82 includes the self-healing coating 58.

In various embodiments, the present disclosure provides a battery pack component including a self-healing coating disposed on at least a portion of a surface of the battery pack component. The self-healing coating includes a precursor and an initiator. The precursor may be included as a monomer, an oligomer, reactive group incorporated in a polymer, or a reactive group incorporated in a copolymer, by way of non-limiting example. The precursor is capable of reacting in a self-healing cationic ring-opening polymerization reaction. The self-healing cationic ring-opening polymerization occurs when a defect is present in the self-healing coating.

The precursor may be a cyclic ether. The cyclic ether may be selected from the group consisting of: selected from the group consisting of: 1,3-dioxolane ($C_3H_6O_2$), tetrahydrofuran (THF) ($C_4H_8O$), 1,4-dioxane ($C_4H_8O_2$), ethylene oxide ($C_2H_4O$), tetrahydropyran ($C_5H_{10}O$), and combinations thereof. In various aspects, the precursor may be a different heterocycle, such as a cyclic ether, a cyclic thioether, a cyclic aminescyclic lactone, a cyclic thiolactone, a cyclic lactum, a cyclic silicone, by way of non-limiting example.

The initiator may include an alkali metal salt selected from the group consisting of: lithium hexafluorophosphate ($LiPF_6$), lithium tetrafluoroborate ($LiBF_4$), lithium fluoride (LiF), lithium bis(fluorosulfonyl)imide ($F_2NaNO_4S_2$), sodium hexafluorophosphate ($NaPF_6$), sodium tetrafluoroborate ($NaBF_4$), sodium fluoride (NaF), sodium bis(fluorosulfonyl)imide ($F_2LiNO_4S_2$), potassium hexafluorophosphate ($KPF_6$), potassium tetrafluoroborate ($KBF_4$), potassium fluoride (KF), potassium bis(fluorosulfonyl)imide ($F_2KNO_4S_2$), and combinations thereof. In certain aspects, the initiator may include an alkali metal imide salt. The alkali metal imide salt may be selected from the group consisting of: lithium bis(fluorosulfonyl)imide ($F_2NaNO_4S_2$), sodium bis(fluorosulfonyl)imide ($F_2LiNO_4S_2$), potassium bis(fluorosulfonyl)imide ($F_2KNO_4S_2$), and combinations thereof.

In certain aspects, the self-healing coating includes a polymer matrix incorporating the precursor that is inherently self-healing. Thus, the precursor will polymerize in the presence of the initiator in response to a defect arising. The polymer matrix may include repeating functional groups derived from the precursor. Reactive precursor groups may also be incorporated in the polymer matrix. The self-healing coating may further include monomers or oligomers including the precursor. Defects in the polymer matrix will automatically self-heal as long as the precursor and initiator are present near the defect.

In other aspects, the self-healing coating includes a non-reactive polymer matrix with precursor and initiator dispersed within the polymer matrix. The polymer matrix does not react with the precursor or the initiator. The precursor and the initiator may be dispersed via microencapsulation or vascular methods. The polymer matrix may include a resin such as polyethylene resin, polypropylene resin, polyethylene oxide resin, phenolic resin, formaldehyde resin, or combinations thereof, by way of non-limiting example. Thus, the precursor may be mixed or blended with other polymers to achieve a variety of material properties. Such mixing or blending may result in a multi-functional coating. The use of multi-functional coatings may reduce complexity and simplify the design of battery systems.

In microencapsulation, the precursor and the initiator are dispersed throughout the polymer matrix in discrete capsules. The capsules can be ruptured by damage to the polymer matrix, thereby triggering the self-healing reaction. In a vascular distribution, the precursor and the initiator are dispersed within the polymer matrix through a network of hollow channels or capillaries. Damage to the polymer matrix can rupture the channels or capillaries to trigger the self-healing reaction.

In still other aspects, the self-healing coating may include a copolymer including a first precursor, a second precursor, and at least one initiator. The first precursor and the second precursor are capable of copolymerizing and forming a copolymer.

The first precursor may be a cyclic ether and the initiator may be an alkali metal imide salt, by way of non-limiting example. The second precursor may be another monomer such as hexamethylene cyclotrisiloxane (D3) ($C_6H_{18}O_3Si_3$), allyl disulfide ($C_6H_{10}S_2$), poly(ethylene glycol) methyl ether methacrylate (PMMA) ($(C_5O_2H_8)_n$), polydimethylsiloxane (PDMS) ($(C_2H_6OSi)_n$), or combinations thereof, by way of non-limiting example.

Copolymers may be used in the self-healing coating to achieve desired material properties. For example, the first precursor may be copolymerized with hexamethylene cyclotrisiloxane (D3) to make the self-healing coating more elastic than a self-healing coating including a polymer derived only from a cyclic ether precursor. In another example, the precursor can be copolymerized with poly (ethylene glycol) methyl ether methacrylate (PMMA) to make the self-healing coating more rigid than a self-healing coating including a polymer derived only from a cyclic ether precursor. Thus, the first precursor may be copolymerized with various other monomers or oligomers to achieve a self-healing coating having properties suitable for the particular application.

In various other embodiments, the present disclosure provides a battery pack component having a self-healing coating disposed on a surface of the battery pack component. A battery pack component may be a cooling system, a coolant hose, a coolant plate, a case, a cover, a package, a cell, a body, or combinations thereof. The self-healing coating may be applied to a surface, including an edge and/or a joint. A joint may include a joint between a cell tab and a package, by way of non-limiting example. The battery may be an electrochemical cell, such as a lithium ion battery, by way of non-limiting example.

Referring to FIGS. 3A-3D, a battery pack 110 is provided. The battery pack 110 includes various components having surfaces that may be coated with a self-healing coating. The battery pack 110 includes a frame tray 112 disposed under a tray 114. The battery pack 110 further includes a cooling system 116. As best shown in FIGS. 3C-3D, the cooling system 116 includes coolant panels 140 and coolant pipes 142. Returning to FIGS. 3A-3B, the battery pack 110 also includes a cell module assembly (CMA) 118, CMA brackets 120, and a tray inner structure 122 and a plurality of tubes 124 disposed between the CMA 118 and the CMA brackets 124. A battery disconnect unit (BDU) 126, a manual safety disconnect (MSD) 128, a voltage, current, temperature module (VITM) 130, and a plurality of bus bars 132 are also included in the battery module 110. A cover 134 having a wiring harness 136 is disposed around the components.

A self-healing coating may be disposed on one or more surfaces of the battery pack or a component of the battery pack. The battery pack may include one or more surfaces having a self-healing coating. The self-healing coating may cover all or a portion of a surface. In some embodiments, and entire surface of a component is coated with the self-healing coating. In battery pack applications, the self-healing coating may have a thickness of greater than or equal to about 50 nanometers (nm) to less than or equal to about 500 microns (μm), optionally greater than or equal to about 20 microns (μm) to less than or equal to about 40 microns (μm).

With reference to FIG. 4A, a self-healing coating 150 may be disposed on an outer surface 152 of a battery pack 154. The outer surface 152 of the battery pack 154 may include aluminum. Additional layers, such as an insulating polymer coating (not shown) may be disposed between the self-healing coating 150 and the battery pack. The self-healing coating 150 may form a barrier to fluids so that the battery pack 156 is leak-proof.

Referring now to FIGS. 4B-4C, self-healing coatings may be applied to surfaces of the cooling system to prevent coolant leakage. In FIG. 4B, a self-healing coating 160 is disposed on an outer surface 162 of a coolant pipe 164 of a cooling system (as best shown in FIGS. 3C-3D). In FIG. 4C, a self-healing coating 170 is disposed on two surface 172, 174 of a coolant plate 176 of a cooling system (as best shown in FIGS. 3C-3D).

With reference to FIG. 5, a battery pack 180 having two cells 182 is provided. The battery pack 180 includes an intermediate layer 184 disposed between the two cells 182. The intermediate layer 184 may include foam. Each cell 182 of the battery pack 180 includes two tabs 186. The battery pack 180 includes a self-healing coating 188. The self-healing coating 188 may be applied to a surface 190 of the cells 182, an edge 192 of the cells, and/or a joint 194 between the tab 186 and the cell 182, by way of non-limiting example. Although the battery pack 180 shown in FIG. 5 includes two cells, it should be understood that battery backs having other numbers of cells may include a self-healing coating within the scope of the present disclosure.

Self-healing coatings according to certain aspects of the present disclosure may result in improved vehicle abuse tolerance. Reparation of defects can reduce the occurrence of short circuiting due to surface damage. The self-healing coating may also improve fluid containment in a battery package or battery pack components by reducing or preventing leaks.

EXAMPLE 1

A 1,3-dioxolane (DOL) precursor is combined with a lithium bis(fluorosulfonyl)imide initiator. A first self-healing coating is made having a concentration of the initiator in the precursor of about 1 molar (M). A second self-healing coating is made having a concentration of the initiator in the precursor of about 2 molar (M). The second self-healing coating is quicker to solidify when compared to the first self-healing coating. Thus, the first self-healing coating is more easily applied to a surface. However, the second self-healing coating time can also be applied to a surface within a controlled coating time. The self-healing coating is applied to a surface of a plate. The self-healing coating is capable of healing a cut having a length of about 2 centimeters (cm) and a depth of about 0.5 millimeters (mm) in 5 minutes at 25° C.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A battery pack component comprising:
a self-healing coating disposed on at least a portion of a surface of the battery pack component, wherein the self-healing coating comprises,
a first polymer formed from one or more precursors, the one or more precursors including a first precursor comprising a heterocycle capable of reacting in a self-healing cationic ring-opening polymerization reaction, and
an initiator comprising an alkali metal salt selected from the group consisting of: lithium hexafluorophosphate ($LiPF_6$), lithium tetrafluoroborate ($LiBF_4$), lithium fluoride (LiF), lithium bis(fluorosulfonyl)imide ($F_2LiNO_4S_2$), sodium hexafluorophosphate ($NaPF_6$), sodium tetrafluoroborate ($NaBF_4$), sodium fluoride (NaF), sodium bis(fluorosulfonyl)imide ($F_2NaNO_4S_2$), potassium hexafluorophosphate ($KPF_6$), potassium tetrafluoroborate ($KBF_4$), potassium fluoride (KF), potassium bis(fluorosulfonyl)imide ($F_2KNO_4S_2$), and combinations thereof, wherein:
a polymer chain of the first polymer is configured to break upon damage to the self-healing coating such that the first precursor is present as a reactive end group, and
the reactive end group is configured to react with another first precursor in the presence of the initiator in the self-healing cationic ring-opening polymerization reaction.

2. The battery pack component of claim 1, wherein the alkali metal salt is an alkali metal imide salt selected from the group consisting of: lithium bis(fluorosulfonyl)imide ($F_2LiNO_4S_2$), sodium bis(fluorosulfonyl)imide ($F_2NaNO_4S_2$), potassium bis(fluorosulfonyl)imide ($F_2KNO_4S_2$), and combinations thereof.

3. The battery pack component of claim 1, wherein the heterocycle is selected from the group consisting of: 1,3-dioxolane ($C_3H_6O_2$), tetrahydrofuran (THF) ($C_4H_8O$), 1,4-dioxane ($C_4H_8O_2$), ethylene oxide ($C_2H_4O$), tetrahydropyran ($C_5H_{10}O$), and combinations thereof.

4. The battery pack component of claim 1, wherein the one or more precursors further comprises a second precursor capable of copolymerizing with the first precursor.

5. The battery pack component of claim 4, wherein the second precursor comprises a monomer selected from the group consisting of: hexamethylene cyclotrisiloxane (D3) ($C_6H_{18}O_3Si_3$), allyl disulfide ($C_6H_{10}S_2$), poly(ethylene glycol) methyl ether methacrylate (PMMA) (($C_5O_2H_8)_n$), polydimethylsiloxane (PDMS) (($C_2H_6OSi)_n$), and combinations thereof.

6. The battery pack component of claim 1, wherein the self-healing coating has a thickness of greater than or equal to about 50 nanometers to less than or equal to about 500 microns.

7. The battery pack component of claim 1, wherein the battery pack component is selected from the group consisting of: a cooling system, a coolant pipe, a coolant plate, a case, a cover, a package, a cell, a body, and combinations thereof.

8. The battery pack component of claim 7, wherein:
the battery pack component includes one or more cells,
each cell includes two tabs and two respective joints connecting the tabs to the cell; and
the self-healing coating is disposed on at least one of: a surface of the one or more cells, an edge of the one or more cells, and a joint.

9. The battery pack component of claim 1, wherein the self-healing coating is capable of repairing defects in the self-healing coating, thereby sealing the battery pack component to prevent fluid leaks from an interior of the battery pack component to an exterior of the battery pack component.

10. The battery pack component of claim 1, wherein the battery pack component further comprises an insulating layer comprising a second polymer, wherein the insulating layer is disposed between the surface and the self-healing coating.

11. The battery pack component of claim 10, wherein the insulating layer comprises nylon $((C_{12}H_{22}N_2O_2)_n)$.

12. The battery pack component of claim 1, wherein the surface of the battery pack component comprises aluminum.

13. The battery pack component of claim 1, wherein the heterocycle comprises 1,3-dioxolane ($C_3H_6O_2$) and the initiator comprises lithium bis(fluorosulfonyl)imide ($F_2LiNO_4S_2$).

14. A method of coating a battery pack component with a self-healing coating, the method comprising:
forming the self-healing coating by combining a precursor comprising a heterocycle and an initiator comprising an alkali metal salt selected from the group consisting of: lithium hexafluorophosphate ($LiPF_6$), lithium tetrafluoroborate ($LiBF_4$), lithium fluoride (LiF), lithium bis(fluorosulfonyl)imide ($F_2LiNO_4S_2$), sodium hexafluorophosphate ($NaPF_6$), sodium tetrafluoroborate ($NaBF_4$), sodium fluoride (NaF), sodium bis(fluorosulfonyl)imide ($F_2NaNO_4S_2$), potassium hexafluorophosphate ($KPF_6$), potassium tetrafluoroborate ($KBF_4$), potassium fluoride (KF), potassium bis(fluorosulfonyl)imide ($F_2KNO_4S_2$), and combinations thereof, wherein the heterocycle is polymerizes by a cationic ring-opening reaction to form a polymer; and
disposing the self-healing coating on at least a portion of a surface of the battery pack component, wherein:
a polymer chain of the polymer is configured to break upon damage to the self-healing coating such that the precursor is present as a reactive end group, and
the reactive end group is configured to react with another precursor in the presence of the initiator in the cationic ring-opening reaction.

15. The method of claim 14, wherein the forming comprises adding the precursor and the initiator at greater than or equal to 1 molar initiator to precursor to less than or equal to 2 molar initiator to precursor.

16. The method of claim 14, further comprising:
repairing a defect in the self-healing coating by polymerizing the precursor in the presence of the initiator by the cationic ring-opening reaction to form a repaired region within the defect.

17. The method of claim 16, wherein repairing the defect further comprises applying a pre-polymer solution comprising the precursor and the initiator to the defect to form the repaired region within the defect, and wherein the repaired region comprises the self-healing coating.

18. A battery pack component comprising:
a self-healing coating disposed on at least a portion of a surface of the battery pack component, wherein the self-healing coating comprises,
a non-reactive polymer matrix,
a precursor dispersed in the non-reactive polymer matrix, the precursor comprising a heterocycle capable of reacting in a self-healing cationic ring-opening polymerization reaction, and
an initiator dispersed in the non-reactive polymer matrix, the initiator comprising an alkali metal salt selected from the group consisting of: lithium hexafluorophosphate ($LiPF_6$), lithium tetrafluoroborate ($LiBF_4$), lithium fluoride (LiF), lithium bis(fluorosulfonyl)imide ($F_2LiNO_4S_2$), sodium hexafluorophosphate ($NaPF_6$), sodium tetrafluoroborate ($NaBF_4$), sodium fluoride (NaF), sodium bis(fluorosulfonyl)imide ($F_2NaNO_4S_2$), potassium hexafluorophosphate ($KPF_6$), potassium tetrafluoroborate ($KBF_4$), potassium fluoride (KF), potassium bis(fluorosulfonyl)imide ($F_2KNO_4S_2$), and combinations thereof, wherein the precursor is configured to react in a self-healing cationic ring-opening reaction in the presence of the initiator, wherein the precursor and the initiator are dispersed in capsules or channels configured to rupture upon damage to the non-reactive polymer matrix to initiate the self-healing cationic ring-opening reaction.

19. The battery pack component of claim 18, wherein the non-reactive polymer matrix comprises a resin selected from the group consisting of: polyethylene resin, polypropylene resin, polyethylene oxide resin, phenolic resin, formaldehyde resin, and combinations thereof.

* * * * *